March 19, 1935.  W. W. FORD  1,995,204
DRAFTING INSTRUMENT
Filed July 7, 1930
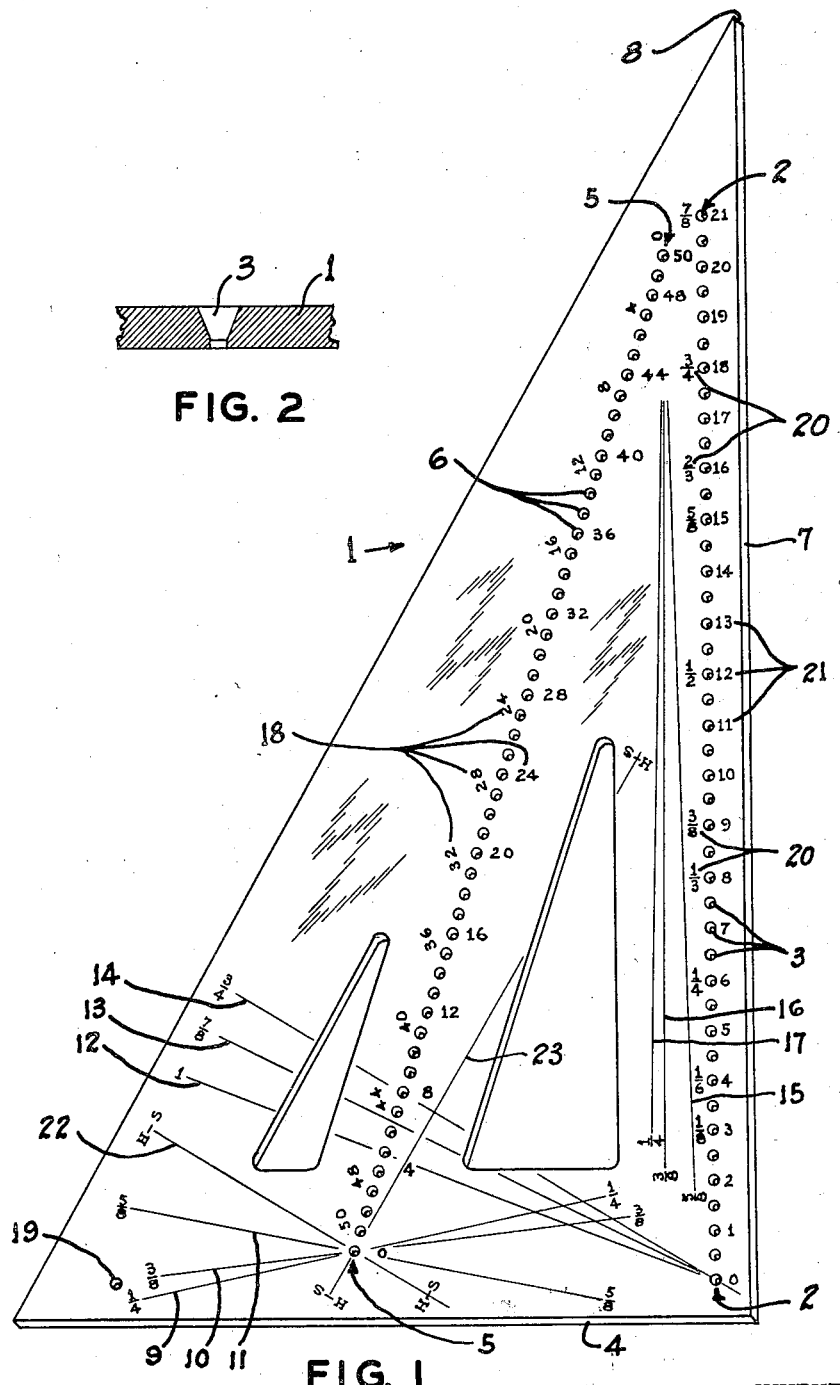

Patented Mar. 19, 1935

1,995,204

UNITED STATES PATENT OFFICE 1,995,204

DRAFTING INSTRUMENT

William Walter Ford, Oklahoma City, Okla.

Application July 7, 1930, Serial No. 465,845

3 Claims. (Cl. 33—104)

My invention relates to a draftsman's scale for laying out, in elevation, definite courses in brick structure, and also for laying out roofs of various degrees of pitch.

The objects of my invention are to provide a device of this class which is new, novel, practical and of utility; which when used by architectural draftsmen and engineers will provide a fast and accurate means for laying out in drawings the definite number and location of courses of brick in a proposed structure; which will be adapted for use upon plans drawn to various scales per inch or per fractional inch; which will be adapted by its various scales to indicate such brick courses when laid in mortar of various specified or desired thickness; which will further provide upon one of its faces, graduated scales which will accurately indicate in inches of rise per foot of run the slope of a roof; which will also indicate the pitch of a roof; an instrument which will be simple in construction and in use; which will be relatively inexpensive in manufacture; which will save much time; which will be durable; which will accomplish all of the above objects and yet be embodied in a usual draftsman's triangle, thus requiring no more room on the drafting board than does a usual triangle; and, which will be efficient in accomplishing all the purposes for which it is intended.

The present method of laying out in elevation the courses of brick forming the walls of a proposed structure, is by use of a finely graduated rule or scale which is laid upon the drawing. In accordance with previously estimated data in which the thickness of the mortar to be used and the relation of the plan per inch to the foot of structure, is known, the drawing is tediously laid off by this scale. In so far as this applicant knows there is now no instrument available which embodies a means of accomplishing the results which applicant's device does in a draftsman's triangle.

In so far as applicant knows or can ascertain there is now no single instrument available for ascertaining or laying off the varying pitches of roofs or of other angles couched in terms such as quarter pitch, half pitch, five-eighths pitch or the like, nor as specified in inches rise per foot of run. Present methods of laying off these pitches or slopes are slow and laborious. The information desired is instantly available by means of my instrument.

With these and other objects in view as will more fully appear, my invention consists in the construction, novel features, and combination of parts hereinafter more fully described, pointed out in the claims hereto appended, and illustrated in the accompanying one-sheet drawing, of which:

Figure 1 is a perspective view of the device; and

Fig. 2 is a fragmentary sectional view showing the typical shape of the various perforations.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

One practical embodiment of the invention as illustrated in the drawing follows:

A usual draftsman's triangle 1, having a line 2 of spaced perforations 3 which lies perpendicular to its base 4, and lies parallel to its side 7, and having a line 5 of spaced perforations 6 which extends at an angle from adjacent said base 4 toward said line 2 and toward the apex 8 of said triangle 1.

One of said perforations 3 may best be seen in Fig. 2, and is typical of all perforations in said triangle 1. All of the perforations are to be used by inserting the point of a pencil therethrough, and making a dot upon the drawing and the perforations are so spaced that by thus using the desired line of perforations and by varying the position of the line by varying the position of the triangle, brick courses of various thicknesses may be pointed off on the drawing. Also the courses may be pointed off to various scales of drawing. In using my device, the drawing being made will, of course, be attached in its usual position upon the drafting board; and a usual T square will be used in a usual manner. With the T square in its usual position, and with the base 4 of the triangle resting against the upper edge thereof, standard brick courses may be pointed off. By using each consecutive one of said perforations 6, a draftsman may lay off courses having one half inch mortar joints on a three-quarter inch scale. By using each alternate one of said perforations 6, the same may be laid off on a 1½ inch scale. As a means of likewise pointing off courses having ¼ inch, ⅜ and ⅝ inch mortar joints upon a ¾ inch scale, respective lines 9, 10 and 11 are provided upon the face of triangle 1, and intersecting the lowermost one of said perforations 6.

Courses having ¼ inch mortar joints are pointed off through each consecutive one of perforations 6 when said line 9 is parallel with the T square, likewise ⅜ inch and ⅝ inch jointed courses may be pointed off when respective lines 10 and 11 are parallel with the upper edge of the T square. As a means of laying off 1 inch, ⅞ inch and ¾ inch jointed brick courses on a ¾ inch scale, the face of said triangle 1, is provided with respective lines 12, 13 and 14 which all intersect the lowermost one of said perforations 3. In this instance said lines 12, 13 or 14 as the case may be, will be placed parallel with the upper edge of the T square, and the courses will be pointed off by using each consecutive one of said perforations 3.

By placing the side 7 of the triangle against the top of the T square, ½ inch jointed brick courses upon a quarter inch scale may be pointed off by using each consecutive one of said perforations 6. As a means for laying off ⅝ inch, ⅜, and ¼ jointed courses upon a quarter inch scale, the face of said triangle 1 is provided with respective lines 15, 16 and 17. By placing line 15 parallel with the T square, and by using each consecutive one of said perforations 6, standard brick courses laid with a ⅝ inch motar joint may be pointed off on a quarter inch scale. Likewise by placing line 16 or 17 parallel with the T square, ⅜ or ¼ inch jointed brick courses may be pointed off by using each consecutive one of said perforations 6. Courses laid with ½ inch joints may be pointed off on a half inch scale by using each alternate one of said perforations 6 while said side 7 of triangle 1 is resting against the T square.

Numerals for determining the number of courses of brick which have been laid out are provided adjacent said line 5 of perforations 6 as indicated at 18.

A means for laying out header and stretcher or soldier courses on a one-half inch scale and with ½ inch joints only is provided in line 22 which intersects the lowermost one of said perforations 6. Said line 22 may be placed perpendicular to the top edge of the T square and headers may be laid off on a one-half inch scale in any horizontal course by using each consecutive one of said perforations 6. The stretchers may be laid off in a like manner, by using each alternate one of said perforations 6.

Having described the use and purpose of the lines 2 and 5 of perforations 3 and 6, and also the use of said lines 9, 10, 11, 12, 13, 14, 15, 16, 17, 22 and 23, the following description is made for the purpose of explaining the manner in which they are originally located with relation to said triangle 1.

The spacing of the perforations 3 of said line 2 is arbitrarily chosen to represent the distance on a ¾ inch scale between centers of mortar joints of 1¼ inch thickness between which standard brick is laid, making the distance between said perforations 3 equal to 3½ inches on a scale of ¾ of an inch to the foot. The number of said perforations 3 is arbitrary, but in the drawing herein I have shown the line 2 of said perforations 3 of a height equal to 42 courses laid as above described. As previously stated hereinabove said line 2 of said perforations 3 is parallel with the side 7 or the long leg of the base triangle 1, and is perpendicular to the base 4 of said triangle 1.

Taking the two legs of said triangle 1 as a basis, the slope of the line of perforations 6 is determined by constructing upon the two legs a triangle in which the line of perforations 6 is the hypotenuse, and making the length of the short leg of this constructed triangle equal to one third the length of the long leg thereof. The spacing of said perforations 6 is determined by measuring perpendicular to the short leg 4 of said triangle 1, and spacing said perforations 6 a distance of 2¾ inches on a scale of ¾ of an inch to a foot. The distance of 2¾ inches was chosen to represent the standard brick height of 2¼ inches, plus ½ inch mortar joint which is the most commonly used joint and scale.

Since the constructed triangle described has the short leg equal to ⅓ the length of the long leg, the spacing of said perforations 6, measured perpendicular to the long leg 7 or perpendicular to the long leg of the constructed triangle, is equal to 2¾ inches on a scale of ¼ inch to the foot.

The angle formed between the line 9 and the line of perforations 6 is determined by constructing upon the line 6 as a hypotenuse, a right triangle with the line 9 extended as the short leg, and the length of the long leg equal to fifty courses of standard brick laid with ¼ inch bed joints, measured on a scale of ¾ inch to the foot. This 50 courses is arbitrarily chosen. The spacing of the perforations in line 6, measured perpendicular to the short leg of this constructed triangle is equal to 2½ inches on a scale of ¾ inch to the foot. In a like manner the lines 10 and 11 are located by using respectively a ⅜ and ⅝ inch joint, which would make the over all height of each course respectively 2⅝ and 2⅞ inches.

Lines 17, 16 and 15 are located as follows:

Said line 17 is located by using the line of perforations 6 as a hypotenuse and constructing a right triangle, using the line 17 extended as the long leg, and using an imaginary line through the lowermost one of said perforations 3 perpendicular to said line 17 as the short leg, and making the length of the short leg, on a scale of ¼ inch to the foot, equal to 50 courses of standard brick laid with ¼ inch joints, or 2½ inches for each course.

Lines 16 and 15 are located in a similar manner as above described with reference to said line 17, with the exception that the short legs are made of a length equal to 50 courses of standard brick laid respectively in ⅜ inch and ⅝ inch joints.

Lines 12, 13 and 14 are located in a manner similar to that above described with reference to the location of said lines 9, 10 and 11, except that the line of perforations 3 is used as the hypotenuse of the constructed triangles.

The perforation 19 is located by intersecting the lowermost one of said perforations 3 with an imaginary line perpendicular to the line 2 of perforations 3, and then intersecting the perforation 3 indicated by the graduation "½", with an imaginary line at a 45 degree angle from said line 2 of perforations 3. Said perforation 19 is then placed at the intersection of the last two mentioned imaginary lines.

In addition to embodying a means for laying out brick courses as above described, I further provide upon said triangle 1 a means for laying out slopes of roofs in rise in inches per running foot of roof, and for laying out roof pitches in fractions of rise per extent of run.

For this purpose, said base 4 is always placed against the T square. A perforation 19 is provided in the left hand portion of triangle 1, and at an equal distance from the base as is positioned the lowermost one of said perforations 3. Various of said perforations 3 are designated by fractional numbers as shown at 20. By making a dot through said perforation 19 and through the desired one of said perforations 3, which is indicated by one of said fractional numbers, and by then drawing a line between the two dots, a roof of any usual or standard pitch may be laid out. For instance, with said base 4 resting against the T square, a dot made through said perforation 19 and another dot made through the perforation 3 which is designated by the fractional numeral ⅛, will describe the slope of a roof laid out on ⅛ pitch.

For designating the rise in inches per foot of span of a roof, various ones of said perforations 3 are designated by a whole numeral as shown at 21. A dot made through said perforation 19 and another dot made through that perforation 3 which is designated by the whole numeral 6, will describe the slope of a roof laid out on 6 inches of rise to each foot of run. The other of said whole numerals are used in a similar manner.

Line 22 is located by intersecting the lowermost one of said perforations 6 with a line drawn perpendicular to the hypotenuse of said triangle 1. Line 23 is located by intersecting the lowermost one of said perforations 6 with a line drawn parallel to the hypotenuse of said triangle 1.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A drafting instrument embodying a draftsman's triangle having a first row of spaced perforations parallel to one of its sides and having a second row of spaced perforations converging at an angle with said first row, each of said perforations adapted to receive the point of a pencil and to permit the making of a dot therethrough, said triangle also having a plurality of lines on its face each intersecting at an angle one perforation of the first row of perforations, and having a plurality of second lines each intersecting at a different angle one perforation of the second row of perforations, said lines having indicia thereby for designating the correct one of either group to place against a T square for laying out brick courses having a desired thickness of mortar joint.

2. A drafting instrument embodying a draftsman's triangle having in combination, a first row of spaced perforations through said triangle and parallel to one of its sides, a second row of spaced perforations converging at an angle with said first row, each of said perforations adapted to receive the point of a pencil and to permit the making of a dot therethrough, a plurality of lines upon the face of said triangle each intersecting at an angle one of the perforations of the first row of perforations, a plurality of lines on the face of said triangle intersecting at various angles the second row of perforations, said lines having indicia for designating the correct one of the lines of either group to place against a T square for laying out brick courses having various desired thicknesses of mortar joints, said triangle having a single perforation remote from said first row, and indicia adjacent said first row for designating certain perforations through which a dot may be made to lay out various roof pitches, the slope of the roof being represented by a line drawn from a dot thus made to a dot made through the remote perforation.

3. A drafting instrument embodying a draftsman's triangle having self-contained means for laying out roofs of various pitches, said means comprising, a row of spaced perforations disposed at right angles to the base of said triangle, said triangle having a single perforation lying remotely from said row, said single perforation spaced the same distance from the base of the triangle as is the end perforation of said row which is nearest said base, said perforations having fractional indicia designating various ones thereof, said indicia indicating the pitch of a line drawn from said single perforation to the indicated perforations in said row.

WILLIAM WALTER FORD.